United States Patent [19]
Clarke et al.

[11] Patent Number: 5,536,056
[45] Date of Patent: Jul. 16, 1996

[54] GRIPPING APPARATUS

[75] Inventors: Glenn Clarke, Flemington; Gary S. Kath, Scotch Plains; Gregory W. King, Carteret, all of N.J.

[73] Assignee: Merck & Co., Inc., Rahway, N.J.

[21] Appl. No.: 283,884

[22] Filed: Aug. 1, 1994

[51] Int. Cl.$^6$ ............................... B25J 15/00; B66C 1/46
[52] U.S. Cl. ............................... 294/119.3; 294/99.1
[58] Field of Search ............................... 294/86.4, 87.1, 294/98.1, 99.1, 119.3; 269/22; 422/99, 104; 901/30, 31, 36, 37, 39

[56] References Cited

U.S. PATENT DOCUMENTS

| | | | |
|---|---|---|---|
| 2,932,825 | 4/1960 | Vaughan | 294/119.3 X |
| 3,840,207 | 10/1974 | Carpenter, Jr. | |
| 4,486,045 | 12/1984 | Trygg | 294/119.3 X |
| 4,607,196 | 8/1986 | Abrahams et al. | |
| 4,740,025 | 4/1988 | Nelson | |
| 5,090,759 | 2/1992 | Sato et al. | 294/119.3 |
| 5,306,469 | 4/1994 | Iles | 294/119.3 X |

FOREIGN PATENT DOCUMENTS

| | | | |
|---|---|---|---|
| 4-183588 | 6/1992 | Japan | 294/119.3 |
| 6-47694 | 2/1994 | Japan | 294/119.3 |
| 1006210 | 3/1983 | U.S.S.R. | 294/119.3 |
| 1276486 | 12/1986 | U.S.S.R. | 294/119.3 |
| 851475 | 10/1960 | United Kingdom | 294/119.3 |
| 1102401 | 2/1968 | United Kingdom | 294/119.3 |
| 2062493 | 5/1981 | United Kingdom . | |
| 2166119 | 4/1986 | United Kingdom . | |

OTHER PUBLICATIONS

Article—Machine Design, May 23, 1994 p. 33, "Air Handles Products Firmly But Gently".

Primary Examiner—Johnny D. Cherry
Attorney, Agent, or Firm—Elliott Korsen; Mark R. Daniel

[57] ABSTRACT

An improved gripping and pinching device particularly useful with laboratory glassware and adaptable for use with a robot or automated system, is disclosed. The device uses flexible tubing as a gripper, eyedropper pincher and as a pinch valve which biases and releases test tubes, vials or the like upon removal and application of a vacuum or pressurizing means.

4 Claims, 2 Drawing Sheets

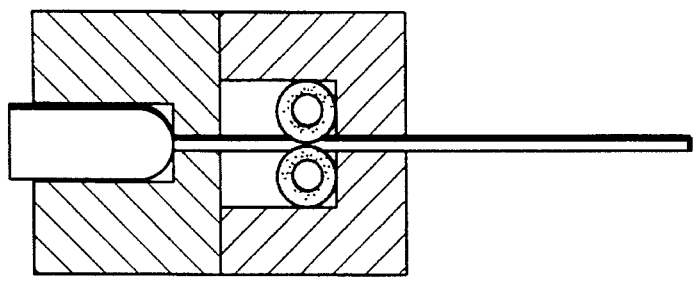
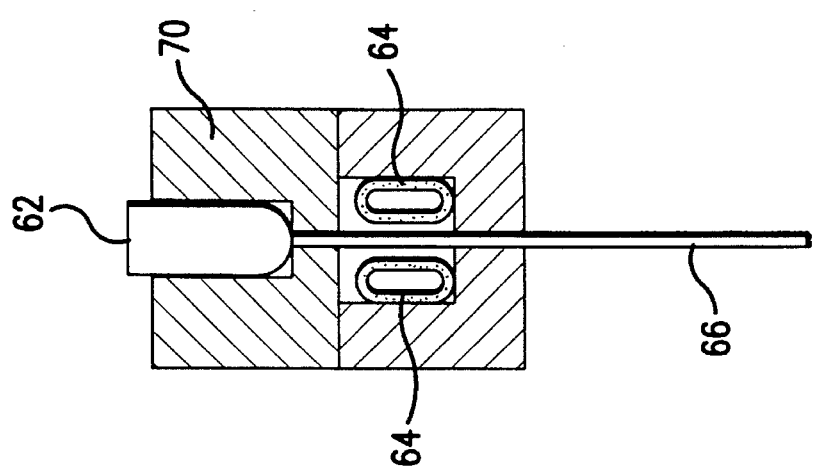
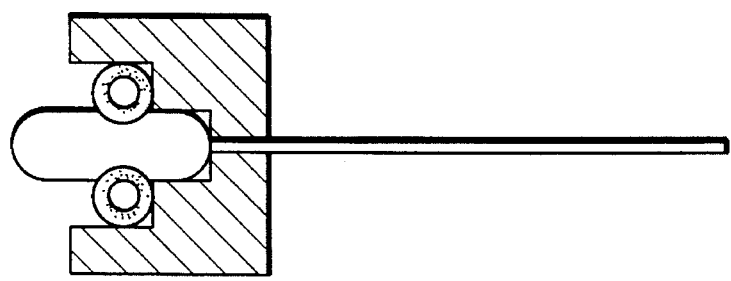
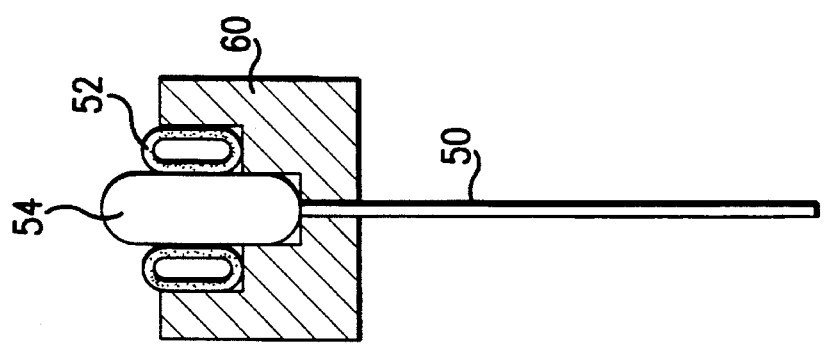

GRIPPING APPARATUS

BACKGROUND OF THE INVENTION

This invention relates to a novel gripping apparatus of the type used, for example, on remote manipulators and robotic devices. The gripper involves a simple but highly efficient way to grasp test tubes, vials and other lab vessels while a robot or automated system performs other operations on said test tube, vial or other lab ware. Additionally, the apparatus can be used as a pincher for working an eyedropper bulb or as a pinch valve to control the flow of liquids.

In recent years, a considerable amount of work has gone into laboratory robots. Systems have been developed for robotic methods for carrying out automatic pipetting, filtering, dilutions, spectrometry, titrations of various sorts, and other automatic procedures involving organic syntheses, testing and sample preparations. Much of the robot-automated work is preparative in nature and relates to use in analytical systems for a wide variety of applications such as analyses of polymers, food samples, extraction of drugs from biological fluids, etc.

As the work in laboratory robotics advanced, various devices have been developed which put increased demand on the equipment normally associated with robotic manipulation. U.S. Pat. No. 4,607,196, for example, discloses a bottle capper which requires that a gripper of lab containers hold the container sufficiently tight to allow the unscrewing of container caps. U.S. Pat. No. 4,740,025 discloses a compound gripper device that assures release of a smooth article from a high-friction gripping surface which often tends to adhere to the article being gripped. This device is allegedly useful for different types of containers.

However, none of the previous devices combine the high-friction gripping of the present invention with a simple, elegant, low-cost mechanism.

SUMMARY OF THE INVENTION

This invention relates to a novel gripping apparatus for gripping test tubes, vials and the like which comprises a housing element containing a plurality of chambers for holding said test tubes, vials or the like and recessed beneath said housing, an area containing flexible tubing able to bias said test tubes, vials or the like upon removal of vacuum or other pressurizing means and able to release said test tubes, vials or the like upon application of said vacuum or other pressurizing means.

This invention also relates to a novel pinching apparatus which may be used with a number of eyedroppers or the like where aspirating and dispensing are necessary. Additionally, this invention relates to a novel type of pinch valve for use in a laboratory environment.

It is contemplated that the invention may be used in its embodiment as a tube gripper when temperature control of the tubes, vials or the like is necessary. Heated or cooled water can circulate through the flexible tubing while the vessel is being held. When the vacuum means is applied, the water is displaced and the vessel is released. Additionally, it is contemplated that this invention would be useful in the handling of radioactive or other types of hazardous materials because of its simple, but effective design and easy disposal in the event of contamination.

Other uses of the invention will be obvious to those skilled in the art upon consideration of this disclosure.

BRIEF DESCRIPTION OF THE DRAWINGS

This invention is illustrated in the drawings wherein:

FIG. 3a illustrates the use as an eyedropper pincher with the flexible tubing biased.

FIG. 3b illustrates the use as an eyedropper pincher with the flexible tubing unbiased.

FIG. 4a illustrates the use as a pinch valve with the vacuum means present.

FIG. 4b illustrates the use as a pinch valve with the vacuum means removed.

DETAILED DESCRIPTION OF THE INVENTION

Referring more particularly to the drawings, wherein like numbers designate like parts throughout, the number 10 designates generally the housing portion of the gripping embodiment of the invention.

Figure 2:
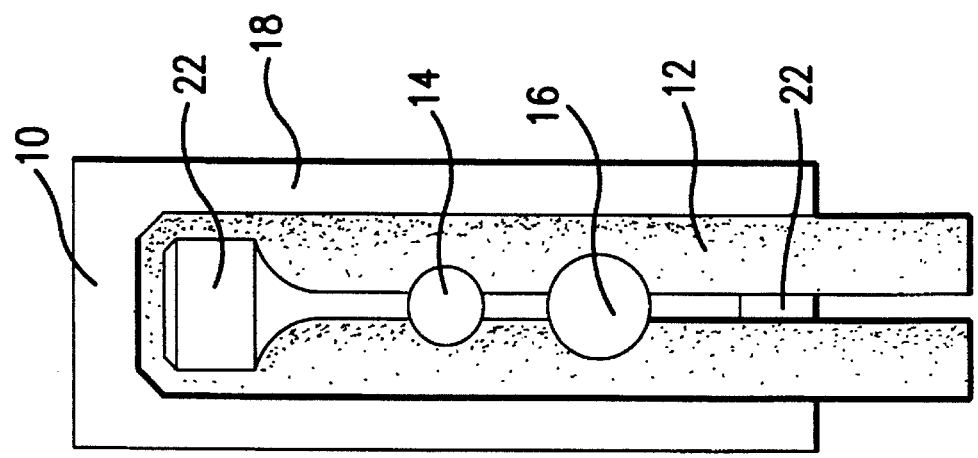
FIG. 2 is a top view of the housing with two holes for different size vessels with the tubing biased.
Figure 1B:
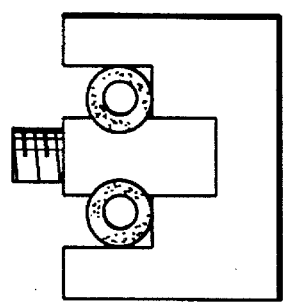
FIG. 1b illustrates the invention with the flexible tubing biased in the tube gripping aspect of the invention.
Figure 1A:
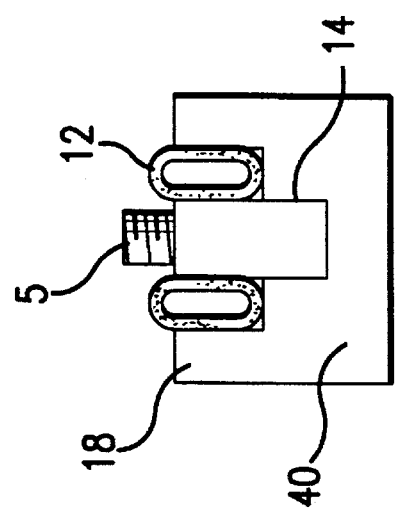
FIG. 1a illustrates the invention with the flexible tubing unbiased in the tube gripping aspect of the invention.

Referring to FIG. 2, the housing 10 includes two longitudinal edges 18 attached to the bottom side of the housing surface 40. Also attached to the bottom side of the housing surface 40 at each end thereof are tabs 22 for placing the flexible tubing 12. On the top of the housing surface 40, spaced suitably to permit the manipulation of the vessels, are chambers 14 and 16 for holding said vessels.

The housing 10 may be made out of any suitable material, in particular HDPE, aluminum or Delrin®, and the housing surface may be of such a size as to permit a plurality of different sized tubes to be gripped by the flexible tubing. The housing is preferably a single piece of machined plastic with the longitudinal walls and tabs formed in the machining process. This is preferred to avoid the use of any adhesive or other suitable attaching means which would not be as strong as a single machined piece. Optionally, the longitudinal edges 18 can be angled such that-the tubing 12 is better able to bias different sized vessels which are placed in the housing. However, the tubes must be within the position of the flexible tubing and the location of the vessel in chambers 14 and 16 in such a way that when the flexible tubing is pressurized or vented to the atmosphere, the tubing's elasticity will cause the tubing to partially wrap around the vessel, firmly gripping it. When the flexible tubing is evacuated, the tubing will collapse, releasing contact with the vessel.

The flexible tubing 12 can be made out of silicon rubber or any type of rubber that is resilient and retains elasticity upon repeat pressurization.

The tubing is arranged such that the two open ends are connected to the vacuum means and the looped end is around one of the tabs 22 in such a manner as to prevent slippage of the tubing.

The particular vacuum or pressure means used to bias and unbias the flexible tubing are not shown because these devices are generally known in the art.

The particular means to control the vacuum or other pressure means is not shown because it forms no part of the invention and many such means are known in the art.

Referring to FIG. 3a, the eyedropper 50 is positioned in a housing 60 of any type which is adaptable to a robot or automated system. Flexible tubing 52 is positioned in such a way so it is able to contact the eyedropper squeeze bulb 54 when the vacuum is removed. Upon application of the vacuum, the flexible tubing flattens and the eyedropper's bulb expands to suction the fluid.

In a third embodiment of the invention, referring to FIGS. 4a and 4b, a pneumatic pinch valve is shown. Vessel 62 is held in a housing 70 of the type which is adaptable to a robot or automated system. Flexible tubing 64 is positioned on each side of a flexible exit tube 66. When a vacuum is applied, the flexible tubing 64 collapses releasing the flexible exit tube 66. When a vacuum is removed, the flexible tubing 64 squeezes against the flexible exit tube 66 and flattens it resulting in a pinching effect which stops the release of fluid from the exit tube.

Obviously, many modifications and variations of the present invention are possible in light of the foregoing teaching. It is to be understood, therefore, that within the scope of the appended claims, the present invention may be practiced otherwise than as is specifically disclosed herein.

What is claimed is:

1. A tool for gripping and releasing test tubes, vials and the like which comprises:
    a) a housing element containing a plurality of chambers for holding said tubes, vials and the like;
    b) a loop of flexible tubing mounted within the housing element such that it is in position to contact the tubes, vials and the like when expanded;
    c) biasing means to effectuate the expanding and contracting of the flexible tubing in order to grip and release the test tubes, vials and the like.

2. The tool as claimed in claim 1 wherein said biasing means comprises hydraulic means, pneumatic means or a vacuum.

3. The tool as claimed in claim 2 wherein said hydraulic means comprises a water line in order to control the temperature of the material within the tube, vial and the like being contacted.

4. The tool as claimed in claim 1 which can optionally be adapted to a laboratory robot or other automated system.

\* \* \* \* \*